United States Patent [19]
Campbell

[11] 3,725,358
[45] Apr. 3, 1973

[54] POLYAMIDE FIBERS FROM MIXTURE OF 1,3-BIS-(4-PIPERIDYL) PROPANE AND BIS(P-AMINOCYCLOHEXYL) METHANE

[75] Inventor: Robert W. Campbell, Bartlesville, Okla.

[73] Assignee: Phillips Petroleum Company, Bartlesville, Okla.

[22] Filed: Apr. 12, 1971

[21] Appl. No.: 133,414

[52] U.S. Cl..............260/78 R, 8/178 R, 260/33.4 R, 264/176 F, 264/178 R
[51] Int. Cl. ............................................C08g 20/20
[58] Field of Search ....................................260/78 R

[56] References Cited

UNITED STATES PATENTS

| | | |
|---|---|---|
| 2,512,606 | 6/1950 | Bolton et al. ........................260/78 R |
| 3,249,591 | 5/1966 | Gadecki et al. ......................260/78 R |
| 3,371,068 | 2/1968 | Preston et al. .......................260/78 R |
| 3,393,210 | 7/1968 | Speck ...............................260/78 R |
| 3,416,302 | 12/1968 | Knospe .............................260/78 R |
| 3,544,527 | 12/1970 | Pietrusza et al. ....................260/78 R |
| 3,598,789 | 8/1971 | Tippetts.............................260/78 R |
| 3,621,075 | 11/1971 | Cleary ..............................260/78 R |

*Primary Examiner*—Harold D. Anderson
*Attorney*—Young and Quigg

[57] ABSTRACT

Polyamide fibers employing 1,3-bis(4-piperidyl)propane as a comonomer in combination with bis(p-aminocyclohexyl)methane or methyl derivative thereof and an acyclic $C_8$ to $C_{16}$ dicarboxylic acid are disclosed, the fibers having improved dyeability with retention of crystallinity.

11 Claims, No Drawings

POLYAMIDE FIBERS FROM MIXTURE OF 1,3-BIS-(4-PIPERIDYL) PROPANE AND BIS(P-AMINOCYCLOHEXYL) METHANE

This invention relates to the production of polyamides.

In one of its more specific aspects, this invention relates to the production of polyamide fibers which possess improved characteristics of dyeability and resistance to shrinkage in boiling water.

Various polyamides formed from the condensation reaction of bis(p-aminocyclohexyl)methane or methyl derivative thereof, herein collectively referred to as PACM, and straight chained dicarboxylic acids are known. Such materials are employed as synthetic fibers. As such, it is desirable that they possess certain properties which make them suitable for the various conditions, such as temperature, to which they are subjected in conventional dyeing and laundering processes. For example, that polyamide prepared from bis(p-amino-cyclohexyl)methane and dodecanedioic acid is recognized as having suitable properties in these respects as evidenced by its high glass transition temperature. It is an object of this invention to provide fibers which have improved properties in this respect and in relation to dyeability and shrinkage in boiling water.

According to this invention, there is provided a linear polyamide which comprises the reaction product of a stereoisomeric mixture of bis(p-amino-cyclohexyl)methane or methyl derivative thereof and 1,3-bis(4-piperidyl)propane and a straight chain $C_8$ to $C_{16}$ dicarboxylic acid having the formula $HO_2C(CH_2)_xCO_2H$, where $x$ is 6 to 14, the polyamide being capable of being drawn into continuous filaments.

The bis(p-aminocyclohexyl)methane or methyl derivative thereof is represented by the formula

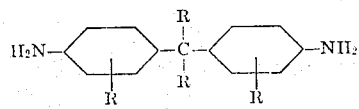

in which each R is a member selected from the group consisting of hydrogen and methyl. At least 40 percent of the bis(p-aminocyclohexyl)methane or methyl derivative thereof will be of the trans-trans configuration.

The straight chain dicarboxylic acids containing eight to 16 carbon atoms include suberic acid, azelaic acid, sebacic acid, undecanedioic acid, dodecanedioic acid, tridecanedioic acid, tetradecanedioic acid, pentadecanedioic acid and hexadecanedioic acid and their mixtures.

The molar ratio of the PACM to the 1,3-bis(4-piperidyl)propane will be within the range of from about 60 to 40 to about 90 to 10, respectively, and preferably from about 65 to 35 to about 85 to 15. The molar ratio of the total of the amino compounds to the dicarboxylic acid should be substantially 1 to 1 although up to about 5 mole percent excess of either the amino compounds or of the acid can be employed.

The polyamides of this invention are prepared by conventional polymerization procedures such as those described in U.S. Pat. No. 2,512,606. Such procedures include a reaction time of from about 2 to about 6 hours at a temperature in the range of about 200° to 340° C. Various extraneous materials can be present in the reaction zone, these materials including water which acts as a heat transfer agent and acetic acid which controls and stabilizes the molecular weight of the polyamide product.

The polyamide fibers of this invention exhibit unique properties which distinguish them from polymers heretofore produced. These polyamides possess these properties in the following approximate ranges.

| Property | Broad Range | Preferred Range |
|---|---|---|
| Wet Tg. °C. | 60–100 | 65–95 |
| Disperse Dyeability (K/S) | ≥10 | ≥10 |
| Work Recovery, % | >50 | >60 |
| Initial Modulus, Wet, 60° C., gpd | >10 | >15 |

These properties are exhibited by the polymers in fiber form, formed by melt spinning, drawing and annealing.

As used herein, these properties are defined as follows:

Disperse dyeability - Using either 1.5 percent Celanthrene Fast Blue 2G, referred to herein as "C," or 2 percent Terasil Blue, referred to herein as "T." K/S values are described in *J. Opt. Soc. Am.*, 38, 1067 (1948).

Work Recovery - From 3 percent elongation per ASTM D 1774–64.

Initial Modulus in Water at 60° C per ASTM D 2256–69.

The method used herein to determine wet Tg was as follows: Five reference polyamides derived from bis(p-aminocyclohexyl)methane were first prepared. These were (1) PACM-12, a polyamide produced from bis(p-aminocyclohexyl)methane (54 percent trans—trans) and dodecanedioic acid in a molar ratio of 1:1; (2) PACM-8, a polyamide produced from bis(p-aminocyclohexyl)methane (54 percent trans—trans) and suberic acid in a molar ratio of 1:1; (3) PACM/12 (80/20)-12, a polyamide produced from bis(p-aminocyclohexyl)methane (54 percent trans—trans), 1,12-dodecanediamine, and dodecanedioic acid in a molar ratio of 0.8:0.2:1, respectively; (4) PACM/BAMCH (80/20)-12, a polyamide produced from bis(p-aminocyclohexyl)methane (54 percent trans—trans), 1,4-bis(aminomethyl)-cyclohexane (60 percent trans), and dodecanedioic acid in a molar ratio of 0.8:0.2:1, respectively; and, (5) PACM/BAMCH (20/80)-12, a polyamide produced from bis(p-aminocyclohexyl)methane (54 percent trans—trans), 1,4-bis(aminomethyl)cyclohexane (60 percent trans), and dodecanedioic acid in a molar ratio of 0.2:0.8:1, respectively. The water absorption, dry Tg, and wet Tg of each of these reference polyamides were determined, and the ratio of wet Tg (in °K) to dry Tg (in °K), expressed as percent Tg retention, was determined. These values are shown in the following table:

| Polyamide | Water Absorption, %[1] | Dry Tg, °C[2] | Wet Tg, °C[3] | Wet Tg Retention, %[4] |
|---|---|---|---|---|
| PACM-12 | 2.4 | 132 | 110 | 94.6 |
| PACM-8 | 4.2 | 150 | 95 | 87.0 |
| PACM/12 (80/20)-12 | 1.8 | 98 | 82 | 96.0 |
| PACM/BAMCH (80/20)-12 | 3.7 | 121 | 81 | 89.8 |
| PAMC/BAMCH (20/80)-12 | 3.0 | 90 | 69 | 94.2 |

(1) Films, 5 mils thick, were pressed and cooled quickly by quenching in tap water. After drying under vacuum over $P_2O_5$ to constant weight (about 48 hours), these films were submerged in boiling water for 80 minutes, blotted dry, and placed in a desiccator containing a saturated magnesium acetate solution in contact with excess solid (a 65 percent relative humidity environment). They were weighed again after standing 48 hours, and the percent water absorbed was determined, based on this weight.
(2) Determined by differential thermal analysis.
(3) Temperature at which drawn fiber's initial modulus is one-half its value at 30° C. (ASTM D 2256-69).
(4) Tg (wet, °K)/Tg (dry, °K) × 100.
(5) Value is probably somewhat high since film had holes which encapsulated water.

The percent water absorption was then plotted against the percent Tg retention for each of the reference polyamides to provide a reference curve from which the wet Tg of a specified polyamide within the scope of this invention was readily calculated by determination of the percent water absorption and the dry Tg and selection of the point on the reference curve which corresponded to the percent water absorption of the polymer.

This invention is illustrated by the following preparations in which the quantities of reactants as indicated were reacted under the conditions described above, that is, at a reaction temperature of about 320° C. for about 3 hours following gradual heating to 320° C. for about 2–3 hours. All inherent viscosities were in m-cresol, with a polymer concentration of 0.5 weight percent, at 30° C.

EXAMPLE I 116.6 parts by weight of bis(p-aminocyclohexyl)methane, 29.1 parts by weight of 1,3-bis(4-piperidyl)propane and 159.6 parts by weight of dodecanedioic acid were reacted under those conditions previously set forth. The copolymer has an inherent viscosity of 0.85.

EXAMPLE II 2.1 parts by weight of bis(p-aminocyclohexyl)methane, 2.1 parts by weight of 1,3-bis(4-piperidyl)propane and 4.6 parts by weight of dodecanedioic acid were reacted. The copolymer had an inherent viscosity of 1.01. (The ratio of PACM to the piperidyl compound is outside of the scope of this invention in this example).

EXAMPLE III 128.1 parts by weight of bis(p-aminocyclohexyl)methane, 32.0 parts by weight of 1,3-bis(4-piperidyl)propane and 132.6 parts by weight of suberic acid were reacted employing 0.46 part by weight of acetic acid for molecular weight control. The copolymer had an inherent viscosity of 0.81.

The polyamides formed from the materials concerned in this invention exhibit unusual properties in comparison with polymers formed from other materials or from the same materials in percentages outside of the scope of this invention, as shown by the following data which compare the polymers produced in the foregoing examples with a polymer prepared with PACM (absent a methyl substituent), only, and dodecanedioic acid, and indicated as PACM-12, and with nylon 66. This comparison is as follows:

| Polymer | Molar Ratio of Diamines | Glass Trans. Temp.,°C., wet | | Dyeability; K/S | Initial Modulus, wet, gpd | Work Recovery, % |
|---|---|---|---|---|---|---|
| | | C | T | | | |
| Nylon 66 | | −15 | 18 | 17 | 6.5 | 37 |
| PACM-12 | | 110 | 1.8 | 7.5 | 22 | 76 |
| Ex. II | 1:1 | <55 | | | | |
| Ex. II | 4:1 | 75 | | 17.5 | 20 | 77 |
| Ex. III | 4:1 | 75 | >10 | | | 73 |

It will be seen from the above that the polyamides of Examples I and III possess properties which are both unexpected in view of, and superior to, the properties of those polyamides produced by procedures outside of the method of this invention and that these properties make the polyamides of this invention particularly suitable for employment as fabrics which are subject to dyeing and laundering processes.

What is claimed is:
1. A linear polyamide fiber consisting essentially of the reaction product of a mixture of
   a. one of bis(p-aminocyclohexyl)methane or a methyl derivative thereof having the formula

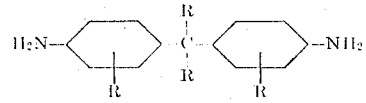

in which one or more of the R groups is methyl, at least 40 weight percent of said bis(p-aminocyclohexyl)methane or said methyl derivative thereof being of the trans—trans configuration;
   b. a straight chain $C_8$ to $C_{16}$ dicarboxylic acid having the formula

in which x has a value within the range of 6 to 14; and,
   c. 1,3-bis(4-piperidyl)propane, the molar ratio of the bis(p-amino-cyclohexyl)methane or the methyl derivative thereof to said 1,3-bis(4-piperidyl)propane being within the range of from about 60 to 40 to about 90 to 10 and the molar ratio of the total of said bis(p-aminocyclohexyl)methane or methyl derivative thereof and said 1,3-bis(4-piperidyl)propane to said dicarboxylic acid being substantially 1 to 1.

2. The polyamide of claim 1 having a wet glass transition temperature within the range of about 60° to 100° C. and an initial modulus in water at 60° C. of not less than 10 grams per denier.

3. The polyamide fiber of claim 1 in which said fiber has a work recovery of not less than about 50 percent and a disperse dyeability of not less than about 10.

4. The polyamide fiber of claim 1 in which said fiber has a wet glass transition temperature within the range of about 65° to 95° C., and an initial modulus in water at 60° C. of not less than about 15 grams per denier.

5. The polyamide fiber of claim 1 in which said fiber has a work recovery of not less than about 60 percent and a disperse dyeability of not less than about 10.

6. The polyamide fiber of claim 1 in which the molar ratio of said one of bis(p-aminocyclohexyl)methane or methyl derivative thereof and said 1,3-bis(4-piperidyl)propane are present in said mixture in a molar ratio within the range of from about 60 to 40 to about 90 to 10.

7. The polyamide fiber of claim 3 in which the molar ratio of said one of bis(p-aminocyclohexyl)methane or methyl derivative thereof and said 1,3-bis(4-piperidyl)propane are present in said mixture in a molar ratio within the range of from about 60 to 40 to about 90 to 10.

8. The polyamide fiber of claim 1 in which the molar ratio of said one of bis(p-aminocyclohexyl)methane or methyl derivative thereof and said 1,3-bis(4-piperidyl)propane are present in said mixture in a molar ratio within the range of from about 65 to 35 to about 85 to 15.

9. The polyamide fiber of claim 3 in which the molar ratio of said one of bis(p-aminocyclohexyl)methane or methyl derivative thereof and said 1,3-bis(4-piperidyl)propane are present in said mixture in a molar ratio within the range of from about 65 to 35 to about 85 to 15.

10. The polyamide fiber of claim 4 in which the molar ratio of said one of bis(p-aminocyclohexyl)methane or methyl derivative thereof and said 1,3-bis(4-piperidyl)propane are present in said mixture in a molar ratio within the range of from about 65 to 35 to about 85 to 15.

11. The polyamide fiber of claim 5 in which the molar ratio of said one of bis(p-aminocyclohexyl)methane or methyl derivative thereof and said 1,3-bis(4-piperidyl)propane are present in said mixture in a molar ratio within the range of from about 65 to 35 to about 85 to 15.

* * * * *